(12) United States Patent
Rocha

(10) Patent No.: US 11,780,400 B2
(45) Date of Patent: Oct. 10, 2023

(54) AIRBAG FOR A VEHICLE OCCUPANT RESTRAINING SYSTEM

(71) Applicants: DALPHI METAL ESPANA S.A., Vigo (ES); SAFELIFE INDUSTRIA DE COMPONENTES DE SEGURANCA AUTOMOVEL S.A., Viauo do Castelo (PT)

(72) Inventor: Diogo Rocha, Viano do Castelo (PT)

(73) Assignee: DALPHI METAL ESPANA S.A., Viauo Do Castelo (PT)

( * ) Notice: Subject to any disclaimer, the term of this patent is extended or adjusted under 35 U.S.C. 154(b) by 50 days.

(21) Appl. No.: 17/429,000

(22) PCT Filed: Feb. 5, 2020

(86) PCT No.: PCT/EP2020/052807
§ 371 (c)(1),
(2) Date: Aug. 6, 2021

(87) PCT Pub. No.: WO2020/161160
PCT Pub. Date: Aug. 13, 2020

(65) Prior Publication Data
US 2022/0089117 A1    Mar. 24, 2022

(30) Foreign Application Priority Data

Feb. 8, 2019 (DE) .......................... 202019100719.2

(51) Int. Cl.
*B60R 21/2338* (2011.01)
*B60R 21/203* (2006.01)
*B60R 21/239* (2006.01)

(52) U.S. Cl.
CPC ........ *B60R 21/2338* (2013.01); *B60R 21/203* (2013.01); *B60R 21/239* (2013.01);
(Continued)

(58) Field of Classification Search
CPC .............. B60R 21/2338; B60R 21/239; B60R 2021/23382; B60R 21/2334; B60R 21/231; B60R 21/203; B60R 2021/2395
See application file for complete search history.

(56) References Cited

U.S. PATENT DOCUMENTS 9,216,712 B1    12/2015  Kwon
2004/0012179 A1    1/2004  Pinsenschaum et al.
(Continued)

FOREIGN PATENT DOCUMENTS

DE    102015110365 A1    12/2015
EP    1391355 A2    2/2004
(Continued)

OTHER PUBLICATIONS

PCT International Search Report for corresponding International Application Serial No. PCT/EP2020/052807, dated Mar. 20, 2020, pp. 1-4.

*Primary Examiner* — Paul N Dickson
*Assistant Examiner* — Matthew Joseph Ganci
(74) *Attorney, Agent, or Firm* — TAROLLI, SUNDHEIM, COVELL & TUMMINO L.L.P.

(57) ABSTRACT

An airbag comprises an airbag panel defining an inflatable volume. A discharge port having a closure is formed in the airbag panel. A tether extends through the inflatable volume from a first end tightly connected to the airbag panel in the direction of the discharge port to an opposite second end. The discharge port closure is connected to the second tether end and the airbag panel. The tether at least in portions has a two-ply design and includes two strap layers. A control strap extends transversely to the tether through the inflatable airbag volume. A first control strap portion is fastened to the
(Continued)

airbag panel and to the first strap layer. A second control strap portion is fastened to the airbag panel and to the second strap layer.

9 Claims, 3 Drawing Sheets

(52) U.S. Cl.
CPC ............... *B60R 2021/2395* (2013.01); *B60R 2021/23382* (2013.01)

(56) References Cited

U.S. PATENT DOCUMENTS

| | | | |
|---|---|---|---|
| 2009/0230663 A1* | 9/2009 | Mills | B60R 21/233 280/739 |
| 2015/0042082 A1* | 2/2015 | Koshikawa | B60R 21/203 280/739 |
| 2015/0375707 A1 | 12/2015 | Saito | |

FOREIGN PATENT DOCUMENTS

| | | |
|---|---|---|
| EP | 2832592 A1 | 2/2015 |
| WO | 2017212839 A1 | 3/2019 |

* cited by examiner

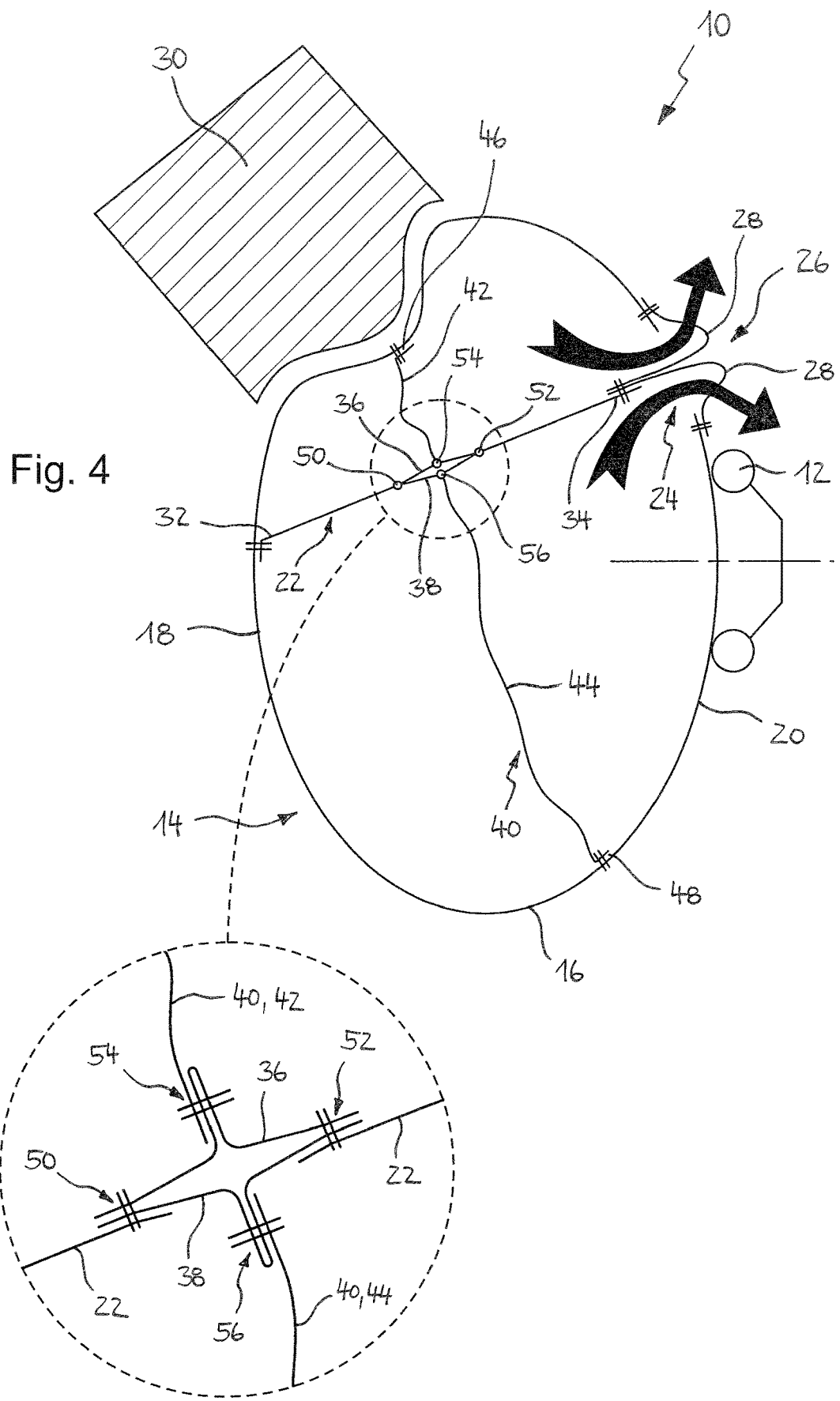

AIRBAG FOR A VEHICLE OCCUPANT RESTRAINING SYSTEM

RELATED APPLICATIONS

This application is a U.S. National Stage Application filed under 35 USC 371, claiming priority to Serial No. PCT/EP2020/052807, filed on 5 Feb. 2020; which claims priority from German Patent Application DE 20 2019 100 719.2, filed 8 Feb. 2019, the entireties of which are hereby incorporated herein by reference.

BACKGROUND OF THE INVENTION

The invention relates to an airbag for a vehicle occupant restraint system comprising an airbag panel defining an inflatable airbag volume, a tether extending inside the airbag through the inflatable airbag volume, a discharge port formed in the airbag panel as well as a discharge port closure for closing the discharge port, wherein the tether extends from a first tether end tightly connected to the airbag panel in the direction of the discharge port to an opposite second tether end, wherein the discharge port closure is connected both to the second tether end and to the airbag panel, and wherein the tether at least in portions has a two-ply design and includes two strap layers.

From the state of the art, airbags are known already which, apart from permanently open discharge ports, include also adaptive discharge ports which are optionally opened or at least partly closed depending on predetermined basic conditions such as e.g. a deployment shape of the airbag and/or a sitting position of the vehicle occupant.

DE 10 2015 110 365 A1 shows a generic airbag comprising an adaptive discharge port which is closed in the completely inflated and deployed state of the airbag and is opened when the occupant immerses into the airbag. The adaptation of the adaptive discharge port takes place "passively" by means of a tether, especially exclusively due to airbag deformation by the vehicle occupant. An electric, pyrotechnic or other "active" control device for opening and/or closing the discharge port is not required, which allows the manufacturing expenditure and the complexity of the vehicle occupant restraint system to be reduced.

When an occupant impacts on the airbag panel of the inflated airbag, the airbag panel is deformed and the adaptive discharge port is released so that the occupant immerses into the airbag, while inflator gas flows out, and is decelerated in a comparatively gentle manner. An undesired rebounding effect of the occupant from the airbag is prevented or at least reduced.

This advantageous restraining effect is brought about, however, only when the occupant impacts on the airbag panel in the fastening are of the tether. When the occupant is sitting in an unusual sitting position during vehicle crash and impacts on the airbag outside said fastening area, the passive release mechanism for the discharge port is not activated and the discharge port remains closed.

SUMMARY OF THE INVENTION

It is the object of the invention to provide an airbag having an as simple construction as possible including an adaptive discharge port which can be passively controlled and which is released and ensures an advantageous restraining effect even when an occupant impacts on the airbag outside the usual impact area.

According to the invention, this object is achieved by an airbag of the type mentioned in the beginning which comprises a control strap extending transversely to the tether through the inflatable airbag volume and including two control strap portions, with a first control strap portion being fastened to the airbag panel and to the first strap layer and a second control strap portion being fastened to the airbag panel and to the second strap layer.

The control strap as well as the clever coupling thereof to the tether increases the sensitivity of the passively controllable, adaptive flow port and results in release of the discharge port even when the occupant is located in an area of the airbag in which the control strap is fastened to the airbag panel.

Within the scope of this application, the tether functionally connects the airbag panel to the discharge port closure, while the control strap functionally connects two portions, especially two opposite portions of the airbag panel. In a crossing area the two straps are coupled to each other so that advantageous restraining effects are resulting for different impact situations. Structurally the tether and the control strap may be composed in most different ways of separate strap portions which then are connected, especially stitched to each other. In this way, the two strap layers of the tether may be manufactured as separate strap portions. However, as an alternative it is also imaginable that either of the strap layers is integrated in one piece in the tether or control strap, for example.

In one embodiment of the airbag, the tether has a two-ply design between a first branching point and a second branching point, wherein the first control strap portion is fastened to the first strap layer in a first coupling point substantially centrally between the branching points and the second control strap portion is fastened to the second strap layer in a second coupling point substantially centrally between the branching points. In this case, the strap layers are loaded especially uniformly in the case of tensile load of the tether and of the control strap and safeguard reliable and properly reproducible control of the adaptive discharge port.

Preferably, the first strap layer and the second strap layer are not connected between the two branching points so that in the inflated state of the airbag the two strap layers form especially a diamond, wherein each of the two branching points and the two coupling points form a vertex of the diamond. Depending on a ratio of the tensile forces in the tether and in the control strap, the diamond shape is variable between a first extreme position in which the strap layers extend almost in parallel to the tether via a central position in which the diamond is substantially a square to a second extreme position in which the strap layers extend almost in parallel to the control strap.

When the airbag is completely inflated, a connecting point of the first control strap portion to the airbag panel and a connecting point of the second control strap portion to the airbag panel may be substantially opposed to each other. Especially, when the airbag is completely inflated, the two control strap portions extend substantially along a straight line extending through a center of the airbag.

According to one embodiment of the airbag, for closing the discharge port the discharge port closure comprises two closing tabs which are fastened inside the airbag to the second tether end, with the closing tabs extending from inside the airbag through the discharge port to the outside of the airbag and are fastened from outside to the airbag panel.

Preferably, when the airbag is inflated, an internal airbag pressure acts on the discharge port closure in the direction of an open position which releases the discharge port for a gas flow.

According to another embodiment of the airbag, a tether length a control strap length and a length of the two strap layers are adapted to a geometry of the airbag so that, when the airbag is completely inflated, the discharge port closure adopts a closing position in which the discharge port is substantially closed. In this way, undesired gas losses can be minimized before the impact of an occupant. Only with a suitable deformation of the airbag is the discharge port released, for example to ensure less aggressive deployment behavior of the airbag or damped immersion of the occupant and, consequently, an advantageous restraining effect.

The airbag panel of the inflated airbag may include especially a front panel portion facing the occupant and a rear panel portion facing away from the occupant, wherein the discharge port is formed in the rear panel portion and the first tether end is tightly connected to the front panel portion. Fastening of the first tether end to the front panel portion ensures that the adaptive discharge port is released in the case of an occupant impacting on the front panel portion so that the occupant is damped when immersing into the airbag and is decelerated. A substantially opposite arrangement of the discharge port in the rear panel portion offers the advantage that the inflator gas does not directly flow toward the occupant when the discharge port is released.

Incidentally, the invention also relates to a steering wheel assembly comprising a vehicle steering wheel which is rotatable about a steering axle and an airbag module having an afore-described airbag.

BRIEF DESCRIPTION OF THE DRAWINGS

Further features and advantages of the invention will be resulting from the following description of a preferred embodiment with reference to the drawings, wherein:

FIG. 4 shows a schematic section across the steering wheel assembly according to FIG. 1 during lateral deformation of the airbag.

DESCRIPTION

Figure 1:
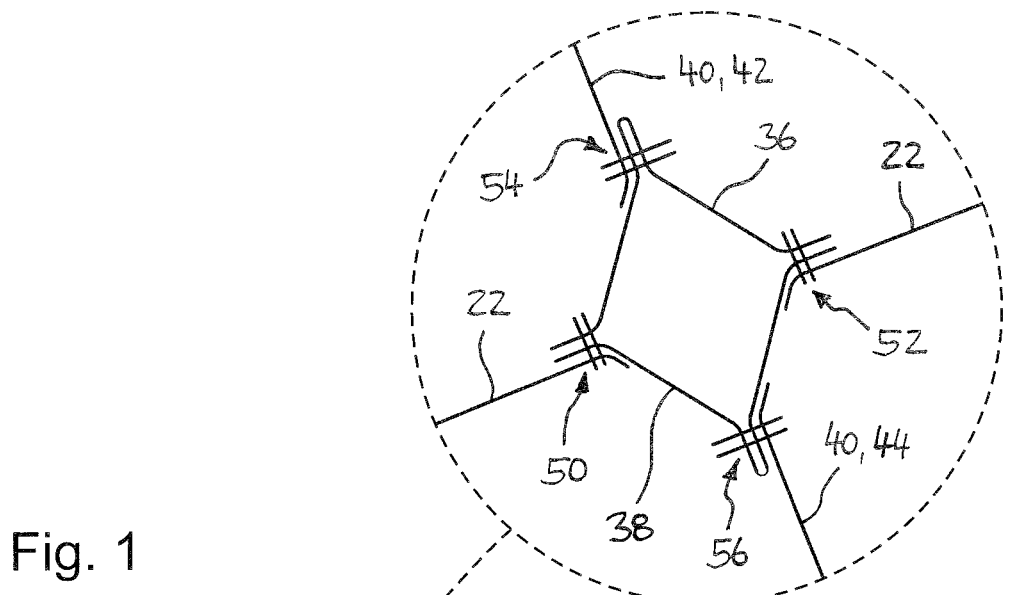
FIG. 1 shows a schematic section across a steering wheel assembly according to the invention comprising an airbag according to the invention in the completely inflated and non-deformed state.
Figure 1:
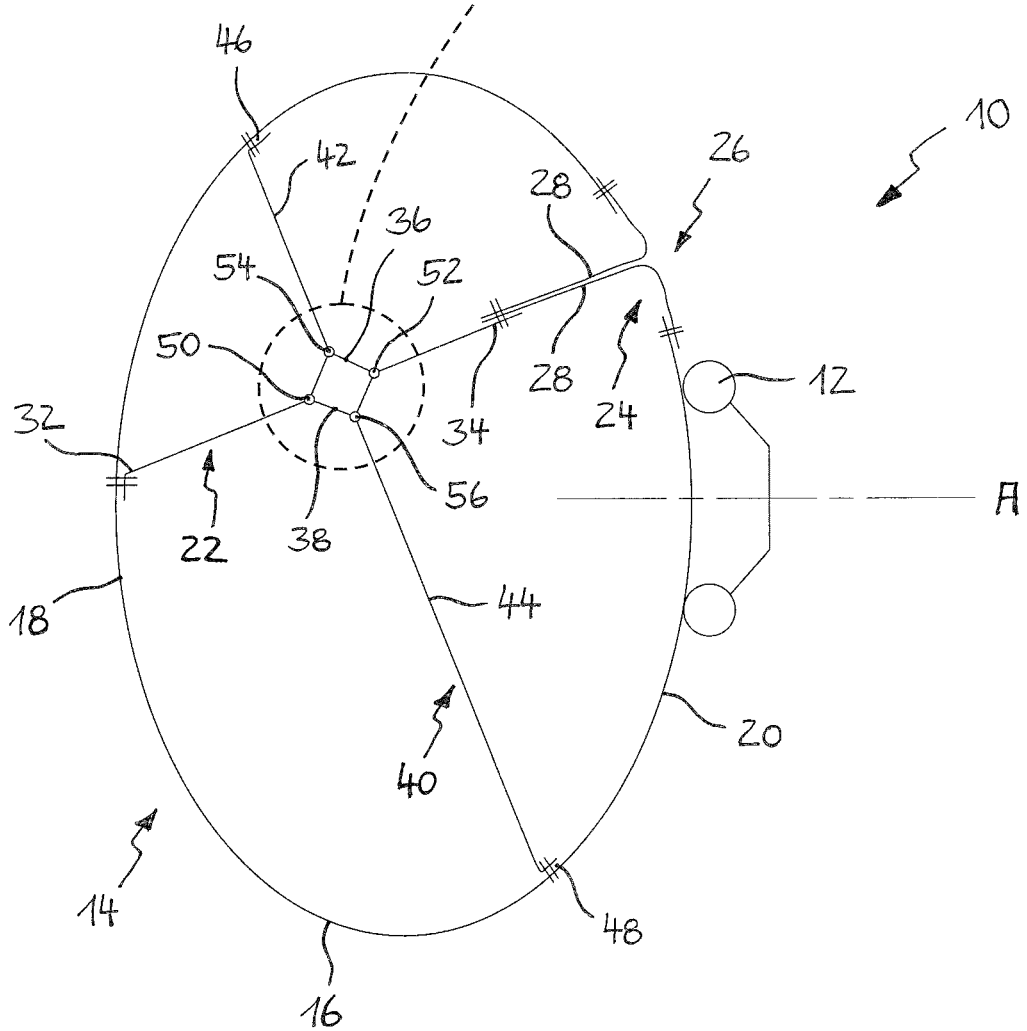

FIGS. 1 to 4 illustrate a steering wheel assembly 10 comprising a vehicle steering wheel 12 which is rotatable about a steering axle A as well as an airbag module mounted in the area of a steering wheel hub and having an airbag 14 for a vehicle occupant restraint system.

The general functional principle of the airbag 14 explained in detail in the following can be easily conferred upon other fields of application of airbag modules as well, however. Consequently, the airbag 14 need not absolutely be a driver-side front airbag but can be used also otherwise with minor adaptations, for example as a passenger airbag.

The airbag 14 comprises an airbag panel 16 that includes a front panel portion 18 and a rear panel portion 20 and defines an inflatable airbag volume, a tether 22 which extends inside the airbag 14 through the inflatable airbag volume, a discharge port 24 which is formed in the rear panel portion 20 of the airbag panel 16 as well as a discharge port closure 26 for closing the discharge port 24. In this context, a portion of the airbag panel 16 is referred to as a front panel portion 18 which in the inflated state of the airbag 14 faces a vehicle occupant 30, wherein in FIGS. 2 to 4 merely a body part of the vehicle occupant 30 is schematically indicated. The rear panel portion 20 correspondingly is a portion of the airbag panel 16 opposed to the front panel portion 18 and facing away from the vehicle occupant 30.

The tether 22 extends, in the inflated state of the airbag 14, from a first tether end 32 tightly connected, especially stitched, to the front panel portion 18 in the direction of the discharge port 24 to an opposite second tether end 34.

The discharge port closure 26 is connected, especially stitched, both to the second tether end 34 and to the airbag panel 16. Concretely speaking, in the present example embodiment the discharge port closure 26 comprises for closing the discharge port 24 two closure tabs 28 which are connected, especially stitched, inside the airbag 14 to the second tether end 34, wherein the closure tabs 28 extend from the interior of the airbag 14 through the discharge port 24 to the outside of the airbag 14 and are connected, especially stitched, from outside to the rear panel portion 20 of the airbag panel 16 on opposite sides of the discharge port 24.

Figure 3:
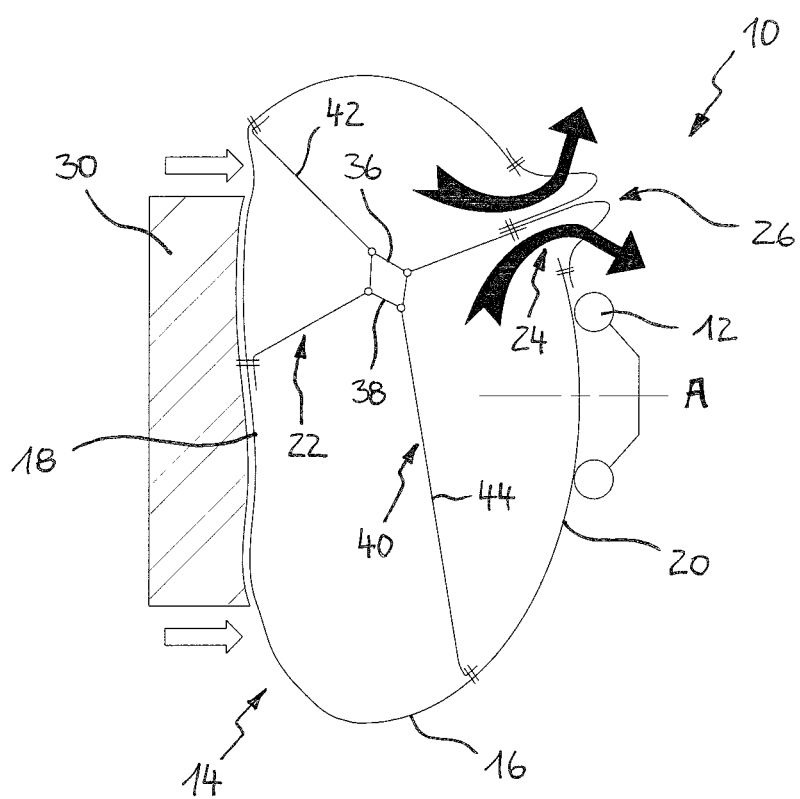
FIG. 3 shows a schematic section across the steering wheel assembly according to FIG. 1 in the advanced state of a frontal deformation of the airbag.

When the airbag 14 is inflated, an internal airbag pressure acts on the discharge port closure 26 in the direction of an open position in which the discharge port 24 is released for a gas flow (see FIGS. 3 and 4).

According to FIGS. 1 to 4, the tether 22 in portions has a two-ply design and in said tether portion includes a first strap layer 36 as well as a second strap layer 38.

Furthermore, the airbag 14 comprises a control strap 40 which includes two control strap portions 42, 44 and is coupled to the tether 22. With the exception of the coupling area to the tether, the control strap 40 extends transversely in the interior of the airbag 14, in the completely inflated and non-deformed state of the airbag 14 especially substantially perpendicularly to the tether 22. A first control strap portion 42 is fastened to the airbag panel 16 and to the first strap layer 36 and a second control strap portion 44 is fastened to the airbag panel 16 as well as to the second strap layer 38.

In the shown embodiment, in the inflated state of the airbag 14 a connecting point 46 of the first control strap portion 42 to the airbag panel 16 and a connecting point 48 of the second control strap portion 44 to the airbag panel 16 are substantially opposed to each other, wherein the control strap 40 extends through an airbag center. According to FIG. 1, the two control strap portions 42, 44 are located especially substantially on a straight line when the airbag 14 is completely inflated and non-deformed.

In the present example embodiment, the tether 22 has a two-ply design between a first branching point 50 and a second branching point 52, wherein the first control strap portion 42 is fastened to the first strap layer 36 in a first coupling point 54 centrally between the branching points 50, 52. The second control strap portion 44 correspondingly is fastened to the second strap layer 38 in a second coupling point 56 centrally between the branching points 46, 48.

The first strap layer 36 and the second strap layer 38 are unconnected between the two branching points 50, 52 and in the inflated state of the airbag 14 form a diamond, wherein each of the two branching points 50, 52 and the two coupling points 54, 56 show a vertex of the diamond.

In the detailed cutouts of FIGS. 1 and 4, a concrete configuration variant is exemplified for the coupling area between the tether 22 and the control strap 40. The first strap layer 36 and the second strap layer 38 are configured as separate strap portions which are stitched to further strap portions of the tether 22 and, resp., the control strap 40 in the branching points 50, 52 and the coupling points 54, 56. However, it is clear that alternatively also numerous further configuration variants are imaginable. For example, either of the two strap layers 36, 38 may be integrated in the tether 22 (or the control strap 40) so that the tether 22 (and, resp., the control strap 40) extends integrally between its respective connecting points to the airbag panel 16.

FIG. 1 illustrates the airbag 14 in a completely inflated and non-deformed state, wherein both the tether 22 and the control strap 40 are stretched, i.e. tensile-loaded. With approximately equal tensile load in the tether 22 and in the control strap 40, the afore-mentioned diamond takes an approximately square shape. A tether length, a control strap length and a length of the two strap layers 36, 38 are adapted to the airbag geometry so that, when the airbag 14 is completely inflated and non-deformed, the discharge port closure 26 adopts a closing position in which the discharge port 24 is largely closed.

Figure 2:
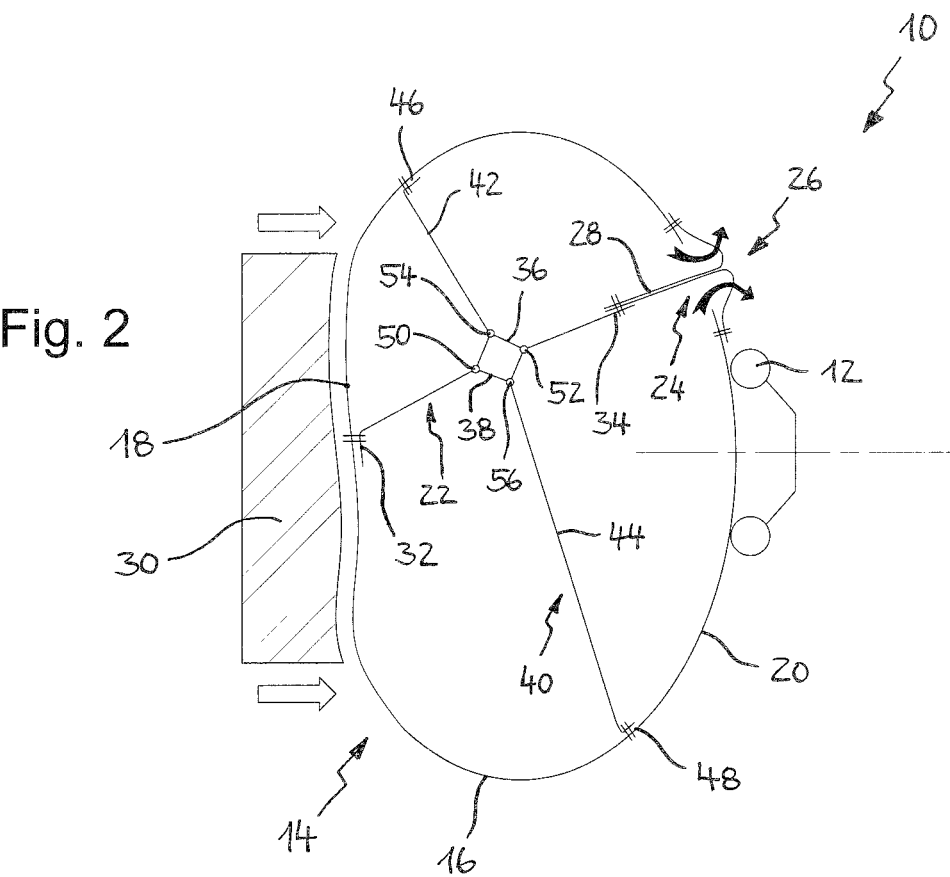
FIG. 2 shows a schematic section across the steering wheel assembly according to FIG. 1 at the beginning of frontal deformation of the airbag.

FIGS. 2 and 3 illustrate a deformation of the airbag 14 as it is caused, for example, by a frontal impact of a vehicle occupant 30. Said occupant impact in the connecting area of the first tether end 32 to the front panel portion 18 occurs whenever in the case of vehicle crash the vehicle occupant 30 is sitting in a "normal", i.e. usual and thus optimal sitting position for occupant restraint.

The rear panel portion 20 of the airbag 14 bears against the vehicle steering wheel 12 and the first tether end 32 moves in the direction of the rear panel portion 20. Due to this movement of the tether end 32 and the pressurization of the discharge port closure 26 by the internal airbag pressure in the direction of its open position, the discharge port 24 is released for a gas flow.

At the beginning of the airbag deformation according to FIG. 2, the release of the discharge port 24 is carried out almost uninfluenced by the control strap 40 as the tether is shifted substantially perpendicularly to the control strap 40. In the case of stronger airbag deformation according to FIG. 3, the diamond formed between the tether 22 and the control strap 40 as well as the airbag 14 is somewhat deformed in the area of the connecting points between the control strap 40 and the airbag panel 16, which has no significant influence on the release of the discharge port 24, however.

The general functional principle for releasing the discharge port 24 in the case of frontal impact of the vehicle occupant 30 according to FIGS. 2 and 3 thus differs only insignificantly from the principle of releasing a gas outlet opening described in DE 10 2015 110 365 A1.

FIG. 4 illustrates a deformation of the airbag 14 as it is caused, for example, when the vehicle occupant 30 is not sitting in the "normal", usual sitting position but in an unusual sitting position which thus is not optimal for occupant restraint. In such case, upon activation of the vehicle occupant restraint system, the vehicle occupant 30 contacts the airbag panel 16 in a transition area from the front panel portion 18 and the rear panel portion 20, especially in a lower transition area or, as shown in FIG. 4, in an upper transition area.

From such occupant contact an airbag deformation is resulting which removes the tension from the control strap 40 so that the control strap 40 extends loosely in the interior of the airbag and no more tensile force acts on the control strap.

The tether 22 continues to remain tensile-loaded, however, as the internal airbag pressure acts on the discharge port closure 26 in the direction of its open position. Accordingly, the diamond formed between the tether 22 and the control strap 40 deforms so that the two strap layers 36, 38 extend substantially in the longitudinal direction of the tether 22 (see FIG. 4). Based on the completely inflated and non-deformed state of the airbag 14 according to FIG. 1, the branching points 50, 52 move away from each other, which, in other words, corresponds to an extension of the tether. This effect causes the discharge port 24 to be released even when the vehicle occupant 30 is sitting in an unusual sitting position when the vehicle occupant restraint system is activated. The restraining effect for such extraordinarily positioned vehicle occupant 30 thus is similarly advantageous as for a normally positioned vehicle occupant 30. Moreover, for vehicle occupants 30 which are not optimally positioned for occupant restraint also the deployment behavior of the airbag 14 is less aggressive due to the possible gas discharge.

The invention claimed is:

1. An airbag for a vehicle occupant restraint system, comprising
    an airbag panel which defines an inflatable airbag volume,
    a tether which extends in the interior of the airbag through the inflatable airbag volume,
    a discharge port which is formed in the airbag panel, and
    a discharge port closure for closing the discharge port,
    wherein the tether extends from a first tether end tightly connected to the airbag panel in the direction of the discharge port to an opposite second tether end,
    wherein the discharge port closure is connected both to the second tether end and to the airbag panel, and
    wherein the tether has a two-ply design and includes first and second strap layers between a first branching point and a second branching point, wherein the first strap layer and second strap layer are not connected between the first and second branching points,
    wherein a control strap is provided which extends transversely to the tether through the inflatable airbag volume and includes two control strap portions,
    wherein a first control strap portion is fastened to the airbag panel as well as to the first strap layer and a second control strap portion is fastened to the airbag panel as well as to the second strap layer.

2. The airbag according to claim 1, wherein the first control strap portion is fastened to the first strap layer in a first coupling point substantially centrally between the branching points and the second control strap portion is fastened to the second strap layer in a second coupling point substantially centrally between the branching points.

3. The airbag according to claim 1, wherein in the inflated state of the airbag the two strap layers form a diamond, wherein each of the two branching points and the two coupling points form a vertex of the diamond.

4. The airbag according to claim 1, wherein with a completely inflated airbag a connecting point of the first control strap portion to the airbag panel and a connecting point of the second control strap portion to the airbag panel are substantially opposed to each other.

5. The airbag according to claim 1, characterized in that the discharge port closure for closing the discharge port comprises two closure tabs which in the interior of the airbag is fastened to the second tether end, wherein the closure tabs extend from the interior of the airbag through the discharge port to the outside of the airbag and are fastened from outside to the airbag panel.

6. The airbag according to claim 1, wherein, when the airbag is inflated, the internal airbag pressure acts on the discharge port closure in the direction of an open position which releases the discharge port for a gas flow.

7. The airbag according to claim 1, wherein a tether length, a control strap length and a length of the two strap layers are adapted to a geometry of the airbag so that, when the airbag is completely inflated, the discharge port closure adopts a closing position in which the discharge port is substantially closed.

8. The airbag according to claim 1, wherein the airbag panel includes a front panel portion and a rear panel portion, with the discharge port being formed in the rear panel portion and the first tether end being tightly connected to the front panel portion.

9. A steering wheel assembly comprising a vehicle steering wheel which is rotatable about a steering axle and an airbag module which includes an airbag according to claim 1.

* * * * *